United States Patent [19]
Dettling

[11] 4,146,180
[45] Mar. 27, 1979

[54] RETRACTABLE ENVIRONMENTAL SEAL

[76] Inventors: Robert A. Frosch, Administrator of the National Aeronautics and Space Administration, with respect to an invention of Joseph R. Dettling, Santa Clara, Calif.

[21] Appl. No.: 891,372

[22] Filed: Mar. 29, 1978

[51] Int. Cl.² .............................................. B05B 15/04
[52] U.S. Cl. ............................... 239/288; 239/265.15; 220/266; 277/192; 138/96 R
[58] Field of Search ....................... 277/102, 192, 233; 138/96 R; 239/288, 265.15; 220/266

[56] References Cited

U.S. PATENT DOCUMENTS

| | | | |
|---|---|---|---|
| 2,786,353 | 3/1957 | Slabaugh | 220/266 X |
| 2,984,972 | 5/1961 | Davidson | 239/265.15 |
| 3,020,710 | 2/1962 | Herzog | 239/265.15 X |
| 3,228,334 | 1/1966 | Oss | 239/288 |
| 3,229,635 | 1/1966 | Oss | 239/288 |
| 3,753,847 | 8/1973 | Gayner et al. | 220/266 X |
| 3,996,966 | 12/1976 | Princell | 220/266 X |

*Primary Examiner*—Robert S. Ward, Jr.
*Attorney, Agent, or Firm*—J. H. Beumer; J. R. Manning; L. D. Wofford, Jr.

[57] ABSTRACT

A retractable environmental seal for use in sealing the opening of the exit cone for a rocket nozzle comprising a diaphragm-like cover having a central region adapted to be seated in sealing relation with the periphery of the opening and characterized by radially extended failure zones for facilitating a pressure-induced rupture of the cover, and a plurality of angularly spaced tension springs connected with the peripheral portion of the cover for retracting fractured segments of the cover from the opening subsequent to a pressure-induced rupture thereof.

8 Claims, 10 Drawing Figures

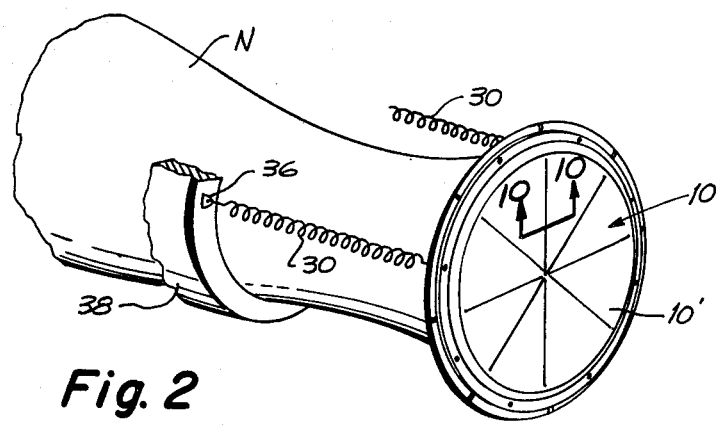
Fig. 2
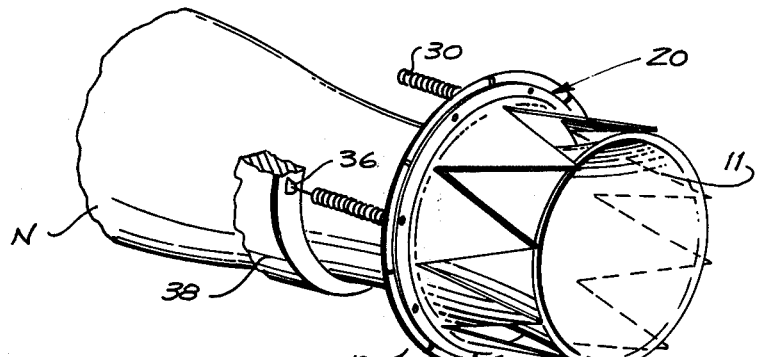
Fig. 3
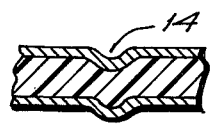
Fig. 10
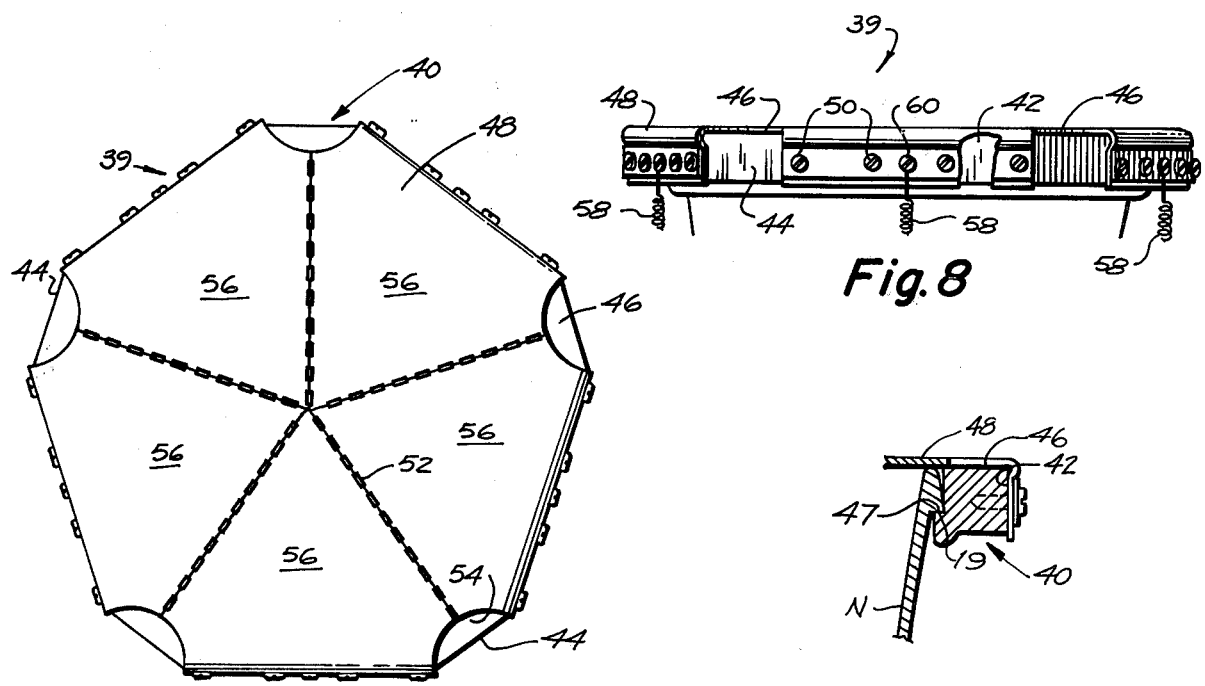
Fig. 7
Fig. 8
Fig. 9

RETRACTABLE ENVIRONMENTAL SEAL

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The invention generally relates to environmental seals for closing openings for pressure chambers, and more particularly to an environmental seal for sealing the opening of an exit cone for a rocket nozzle.

2. Description of the Prior Art

The prior art is, of course, replete with rocket nozzle closure members adapted to function as environmental seals. For example, see United States Letters Patents to George K. Oss No. 3,229,635 and 3,228,334. Each of these patents discloses a seal for a rocket motor. The patented seals are adapted to be expelled in response to a build-up of pressure within the nozzle.

In many solid rocket motor applications it is required that the nozzles of the motors be environmentally sealed until ignition occurs. Usually, the environmental seal is blown off at or immediately prior to ignition. Unfortunately, however, in some cases this technique simply is not acceptable since the resultant ejecta tends to be hazardous to nearby hardware. This is particularly true for space shuttle booster separation motors. Moreover, as pointed out by the patentee Oss, aforementioned, it also is desirable to assure that seals be removed in a manner which leaves the nozzle free and clear of ejecta in order to avoid interference with missile guidance.

It is, therefore, the general purpose of the instant invention to provide a retractable environmental seal for sealing the opening of an exit cone for a rocket nozzle which leaves no ejecta upon removal, ensures that adjacent hardware is protected and/or assures that guidance interference is avoided.

OBJECTS AND SUMMARY OF THE INVENTION

It is, therefore, an object of the invention to provide a removable environmental seal for the discharge opening of a pressure chamber such as a rocket nozzle or the like.

It is another object to provide a retractable environmental seal for sealing the opening of a cone for a rocket nozzle which leaves no ejecta upon removal.

It is another object to provide an environmental seal for rocket seals adapted to rupture in response to pressures developed within the nozzle and be retracted subsequent to rupture without subjecting nearby hardware to the hazardous effects of ejecta.

Another object is to provide a retractable environmental seal for sealing the opening of an exit cone for a rocket nozzle although not necessarily restricted in use thereto since the retractable seal which embodies the principles of the instant invention has utility in other environments such as enclosing openings for pressure chambers of general utility.

These and other objects and advantages are achieved through the use of a cover disk formed of elastomeric material and supported in place by a spring biased retainer ring adapted to retract fragments of the disk, subsequent to rupture, as will hereinafter become more readily apparent by reference to the following description and claims in light of the accompanying drawings.

BRIEF DESCRIPTION OF THE DRAWINGS

FIG. 2 is a perspective view of an exit cone for a rocket nozzle sealed by a retractable environmental seal which embodies the principles of the instant invention.

FIG. 3 is a perspective view, similar to FIG. 2, illustrating the retractable environmental seal in a ruptured and retracted configuration.

FIG. 7 is an end view of a modified form of the seal.

FIG. 8 is a side elevational, partially fragmented view of the modified form of the seal shown in FIG. 7.

FIG. 9 is a fragmented, partially sectioned view illustrating the manner in which the modified form of the seal is supported in place.

FIG. 10 is a fragmented cross sectional view of a portion of the material employed in forming the seal, taken generally along line 10—10 of FIG. 2.

DESCRIPTION OF THE PREFERRED EMBODIMENTS

First Form

Figure 1:
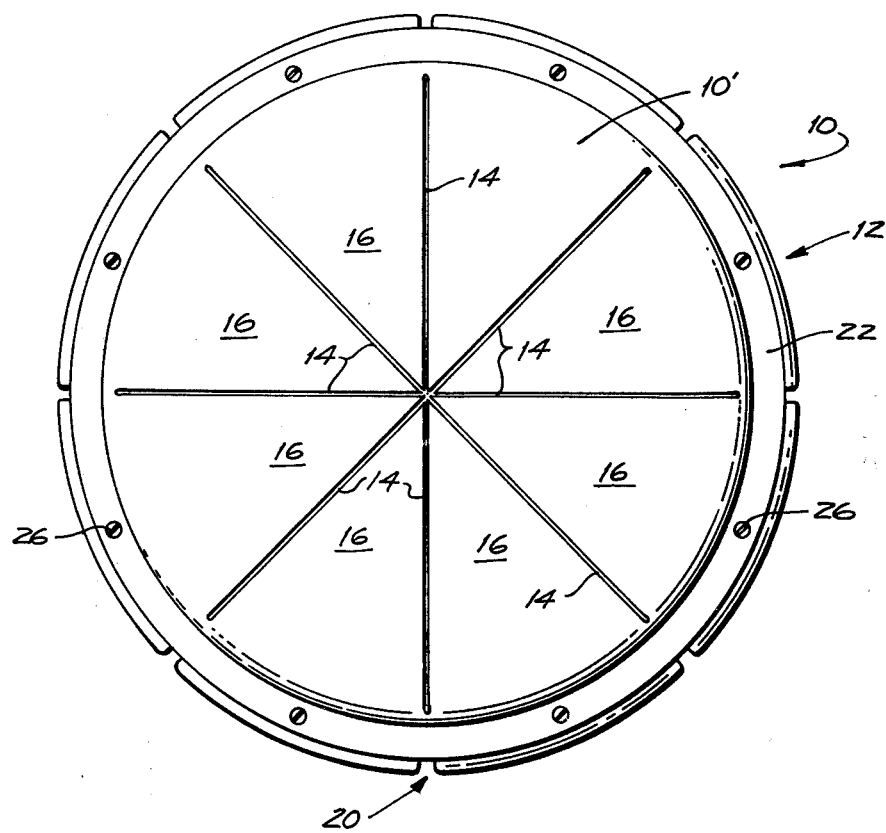
FIG. 1 is an end elevational view of one form of the seal which embodies the principles of the instant invention.

Referring now to the drawings wherein like reference characters designate like or corresponding parts throughout the several views there is shown in FIG. 1 an end view of a retractable environmental seal, generally designated 10, comprising a first form of the instant invention. As shown, the seal includes a cover 10' positioned to span the exit opening 11 of the exit cone, not designated, for a rocket nozzle, designated N.

As shown in FIG. 1, the cover 10' is of a substantially disk shaped configuration and includes a peripheral zone generally designated 12. As a practical matter, the cover 10' is formed of an elastomeric material and is embossed, scored or similarly operated upon to provide a plurality weakened zone comprising linear grooves 14. These grooves are extended diametrically across the face of the seal dividing the seal into a plurality of pie-shaped segments 16. The grooves 14 establish linearly extended failure zones which facilitate uniform and rapid rupturing of the cover 10' in the presence of operative pressures developed within the nozzle.

About the exit opening 11 of the nozzle N there is provided an annular lip 19 the purpose of which will hereinafter become more readily apparent. The cover 10' is supported in place by a retainer ring assembly, generally designated 20, FIG. 6, which includes a first ring 22 and a second ring 24 disposed in coaxial alignment with the peripheral portion 12 of the seal being sandwiched therebetween. As a practical matter, it is to be noted that the internal diameter of the lower ring 24 is slightly less than the external diameter of the lip 19 so that the planar surface thereof is positionable in mated relation with the lip for arresting the assembly 20. Thus the lip 19 is adapted to function as a stop for arresting and thus positioning the assembly 20 in an assembled orientation relative to the opening 11.

A plurality of headed bolts 26 are extended through suitably formed bores, not designated, disposed in coaxial alignment in the rings 24 and 22 and secured in place by nuts 28. Of course, the particular manner in which the peripheral portion 12 of the cover 10' is mated and/or secured within the retainer ring assembly 20 is varied as desired.

Figures 4, 5, 6:
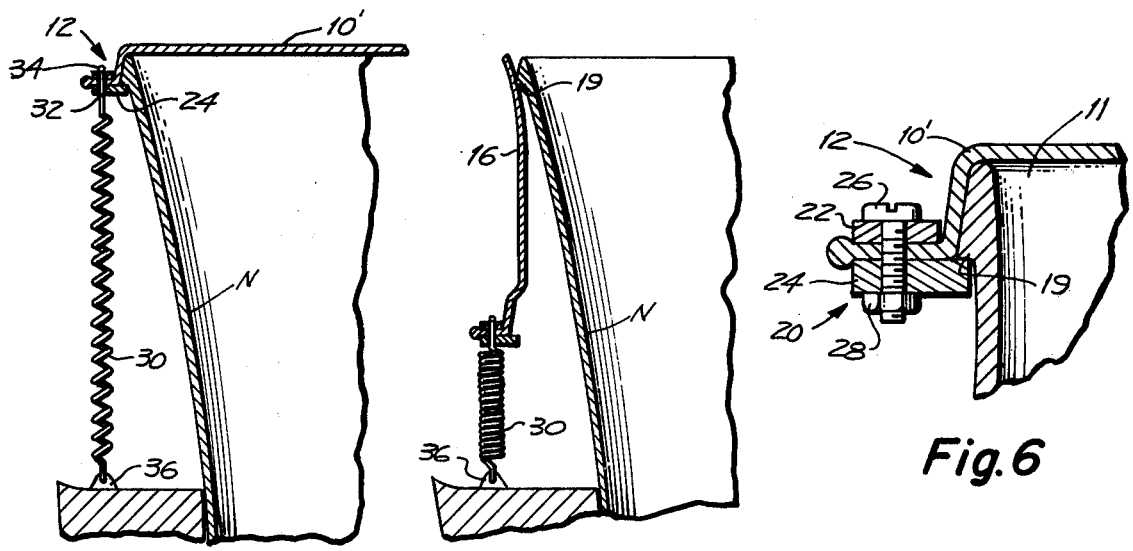
FIG. 4 is a partially sectioned, fragmentary view of the seal in its sealing configuration.
FIG. 5 is a sectioned perspective view, similar to FIG. 4, illustrating the seal in its ruptured configuration.
FIG. 6 is a fragmented, partially sectioned view illustrating one manner in which the seal is supported in sealing relation with the nozzle.

Also connected to the retainer ring assembly 20, in angular spaced relation about the periphery of the nozzle N there is a plurality of tension springs 30 of suitable design. As shown in FIG. 4, the spring 30 preferably includes a shank 32 having provided at its distal end a suitably formed protuberance 34 seated on the upper surface of the ring 22. The shank is extended through coaxially aligned bores formed in the rings 22 and 24 and serves as an anchor for the distal end of the spring. The base end of the spring 30 is connected through a suitable eye 36 to an anchor ring 38 rigidly mounted on the nozzle N in circumscribing relation therewith and in a displaced relationship with the exit opening of the exit cone. As a practical matter, the base 38 is spaced a distance from the exit opening of the exit cone sufficient to permit the segments 16 of the cover 10' to be withdrawn completely from the opening in response to a spring-induced retraction of the retainer ring assembly 20.

It should now be apparent that in response to a pressure build-up within the nozzle N the cover 10' is adapted to rupture along failure zones, established by the grooves 14, and that in response to a rupturing of the seal the retainer ring assembly 20 is released for axial displacement under the applied forces of the springs 30 so that the segments 16 are completely withdrawn from the exit opening 11 of the exit cone of nozzle N, while remaining in a captured relationship with the retainer ring assembly 20.

Second Form

Referring now to FIGS. 7, 8 and 9, wherein is illustrated a second form of the invention comprising a seal designated 39, it is to be understood that where desired the retainer ring assembly 20 is replaced by a retainer ring assembly 40, differing structurally somewhat from the retainer ring assembly 20.

It is to be understood that the retainer ring assembly 40 includes an annular inner surface of a diameter substantially equal to the external diameter of the exit cone of the nozzle N while the periphery of the retainer ring assembly 40 is defined by angularly related planar surface segments designated 44 and 42. As a practical matter, the periphery of the retainer ring assembly 40 conforms substantially to a pentagonal configuration while the face of the retainer assembly 40 includes an annular surface 46 lying in the plane of the annular surface defining the extremity of the exit cone of nozzle N.

It is noted that the retainer ring assembly 40 includes an annular lip 47 adapted to mate with the annular lip 19 for the nozzle end as indicated in FIG. 9. The lip 19 functions to arrest the assembly 40 in substantially the same manner as the lip arrests the assembly 20.

As a practical matter a cover 48 fabricated from a material similar to that from which the cover 10' is fabricated, is extended beyond the periphery of the retainer ring assembly 40, folded and secured to the edge surfaces 62. While any suitable means is employed in securing the cover 48 to the ring assembly 40, a plurality of screws 50 serve quite satisfactorily for this purpose.

The cover 48 is provided with radially extended grooves 52 the purpose of which is to establish failure zones for the cover 48, similar in purpose to the grooves 14 provided for the cover 10'. However, it is important to note that each of the grooves 52 terminate in an arcuate relief 54 the surface of which conforms to a segment of a circle having a diameter substantially equal to the length of an adjacent edge surface 44. Consequently, like the cover 10', the cover 48 is adapted to be ruptured along zones located between pie-shaped segments 56, in response to pressures developed within the exit cone of the nozzle N.

At this juncture it is important to note that the configuration of the retainer ring assembly 40 and the arcuate surfaces defining in the cover 48 reliefs 54 facilitate complete retraction of the segments 56 from the exit opening of the exit cone of the nozzle N. Such a result is achieved because the segments 56 are permitted to fold along axes intersecting the surfaces defining reliefs 54.

In order to retract the retainer ring assembly 40, tension springs 58, similar to tension springs 30 are connected through screws 60 to the peripheral surfaces of the edge surfaces 42 of the retainer ring assembly 40. The springs 58 function for the same purposes and in a manner similar to the springs 30. Therefore, a detailed description of the springs 58 is omitted in the interest of brevity.

It is important here to appreciate that the material from which the covers 10' and 48 are fabricated preferably exhibits elastomeric characteristics. One such material comprises a layer of Viton rubber sandwiched between sheets of Kevlar. Of course, the seal may be formed from a non-elastomeric material, since metals and various composites can be employed equally as well. Furthermore, it is important to note that the grooves 14 and 52 need not extend the full length of the radius of the seals, in most instances, since the force applied by the springs 30 and 58 often is sufficient to tear the material of the seals.

OPERATION

It is believed that in view of the foregoing description of the alternate forms of the device, the operation thereof is readily understood, however, it will be briefly reviewed at this point.

It should be apparent that the disclosed forms of the invention operate in substantially the same way to achieve substantially the same results, namely to maintain an exit cone for a rocket nozzle in an environmentally sealed state until ignition of the rocket motor and then withdraw the sealing element without subjecting hardware to the effects of ejecta. However, the structure of the seal 39 illustrated in FIGS. 7, 8 and 9 differs slightly from the structures of the seal 10 shown in FIGS. 1 through 6. The difference in structure permits the retraction of the segments 56 without interference with the exit cone, while the segments 16 shown in FIGS. 1 through 6 may experience interference as folds are formed along cords of the assembly 20.

Due to the similarity in the operation of the assemblies 20 and 40 herein disclosed, the operation of the assembly shown in FIGS. 1 through 6 is believed adequate to provide for a complete understanding of the instant invention.

The cover 10' is positioned across the exit opening 11 of the exit cone for the nozzle N and secured in place by the assembly 20 including the rings 22 and 24. The ring 24 is engaged by the annular lip 19, circumscribing the exit opening of the nozzle N while the springs 30 are connected to the base 38 and thus placed under substantial tension. Thus the seal 10 is assembled for operation.

It is to be understood that as a consequence of ignition of the associated rocket motor, not shown, pressure is developed within the nozzle for causing the cover 10' to rupture along the grooves 14. Thus the cover 10' is divided into a plurality of pie-shaped segments. As a consequence of the rupturing of the cover 10', the retainer ring assembly 20 is released for retraction under the forces applied thereto by the springs 30. As retraction of the retainer ring assembly 20 occurs, the segments 16 are folded and withdrawn simultaneously from across the opening 11 of the nozzle N. It should be understood that the segments are maintained in a captured relationship with the retainer ring assembly 20, as the retainer ring assembly is withdrawn to a position located in close proximity with the base 38. Thus the seal 10 is removed from the nozzle opening 11 leaving no ejecta which otherwise might be present and be hazardous to a successful operation of the motor with which the nozzle N is associated.

In view of the foregoing, it is believed to be apparent that through the instant invention there is provided a practical solution to the perplexing problem of removing environmental seals from nozzles associated with rocket motors without subjecting the motor and its environment to the hazardous effects of ejecta.

I claim:

1. A retractable environmental seal for a discharge opening of a pressure chamber comprising:
   A. a cover comprising a diaphragm having a central region adapted to be seated in sealing relation with a discharge opening of a pressure chamber including means defining failure zones for facilitating pressure-induced rupturing of the diaphragm; and
   B. means responsive to a rupturing of the diaphragm for retracting the diaphragm relative to the opening of the pressure chamber.

2. A retractable environmental seal for sealing the opening of an exit cone for a rocket nozzle comprising:
   A. a cover of a disk-shaped configuration formed of a rupturable material and characterized by a plurality of radially extended failure zones for facilitating pressure-induced rupturing of the cover;
   B. cover support means including a retainer ring secured to the peripheral zone of the cover and adapted to be received in a circumscribing relationship with the cone of a rocket nozzle; and
   C. retraction means for retracting said ring relative to the cone in response to a rupturing of said cover including a plurality of resilient members connected to said ring for continuously urging the ring in retractive displacement relative to the exit.

3. The seal of claim 2 wherein said cover extends radially beyond the periphery of said cone in the plane of the opening thereof and said retainer ring includes an annular surface substantially coincident with said plane.

4. The seal of claim 3 wherein each of said failure zone comprise a radially extended groove terminating in a relief defined in the peripheral zone of the cover.

5. The seal of claim 4 wherein the peripheral zone of the cover terminates at a plurality of angularly related linear edge surfaces.

6. The seal of claim 2 wherein said retraction means includes a plurality of angularly spaced tension springs having one end connected to said retainer ring.

7. The seal of claim 6 wherein said cover support means further includes positioning means for supporting said retainer ring comprising an annular lip circumscribing said cone in juxtaposition with said opening and said retainer ring includes an annular surface for engaging said lip.

8. The seal of claim 7 wherein said cover is of a laminated construction comprising a layer of Viton rubber sandwiched between sheets of Kevlar.

* * * * *